United States Patent [19]

Des Jardins

[11] Patent Number: 4,951,144
[45] Date of Patent: Aug. 21, 1990

[54] RECURSIVE VIDEO BLUR EFFECT

[75] Inventor: Philip A. Des Jardins, Nevada City, Calif.

[73] Assignee: The Grass Valley Group, Inc., Nevada City, Calif.

[21] Appl. No.: 337,230

[22] Filed: Apr. 12, 1989

[51] Int. Cl.⁵ .......................................... H04N 5/272
[52] U.S. Cl. ................................ 358/182; 358/22; 358/183
[58] Field of Search ................ 358/182, 44, 105, 183, 358/22, 133, 135, 136, 166

[56] References Cited

U.S. PATENT DOCUMENTS

| | | | |
|---|---|---|---|
| 4,223,353 | 9/1980 | Keller et al. | 358/230 |
| 4,663,661 | 5/1987 | Weldy | 358/44 |
| 4,677,486 | 6/1987 | Noda | 358/166 |
| 4,752,826 | 6/1988 | Barnett | 358/140 |

Primary Examiner—Tommy P. Chin
Attorney, Agent, or Firm—Francis I. Gray

[57] ABSTRACT

A recursive video blur effect is obtained by inserting a lowpass filter into a recursive feedback loop. Each pass of an output video signal through the recursive feedback loop successively smears the image represented by the video signal so that, when combined with an input video signal to produce the output video signal, a smoky fade effect is produced.

7 Claims, 3 Drawing Sheets

RECURSIVE VIDEO BLUR EFFECT

BACKGROUND OF THE INVENTION

The present invention relates to recursive effects devices, and more particularly to a recursive video blur effect using a lowpass filter in a recursive feedback loop.

In recursive video effects devices new incoming video is mixed with old stored video to implement effects such as decay, picture trails, etc. This is accomplished by multiplying the old video, which is stored in a frame store, by a decay constant between zero and unity. The new incoming video is multiplied by the complement of this decay constant, defined as one minus the decay constant, and added to the old video as modified by the decay constant. A unity value for the decay constant yields a frozen picture, i.e., all old video, and a zero value yields no effect, i.e., all new video.

What is desired is a circuit to produce a video blur effect using recursive effects techniques.

SUMMARY OF THE INVENTION

Accordingly the present invention provides a recursive video blur effect using a lowpass filter in a recursive feedback loop. An input video signal is multiplied by the complement of a decay constant and added to a video signal that is one frame old and has been multiplied by the decay constant. The resulting output video is input to a recursive feedback loop having a recursive frame store and the lowpass filter in series. The output of the recursive feedback loop is the one-frame-old video signal for the next frame. Each pass through the lowpass filter blurs the stored video so that the result is a video blur effect with the rate of fade of the blurred video being a function of the decay constant and with the rate of blurring being determined by the filter characteristics.

The objects, advantages and other novel features of the present invention are apparent from the following detailed description when read in light of the appended claims and attached drawing.

DESCRIPTION OF THE PREFERRED EMBODIMENT

Figure 1:
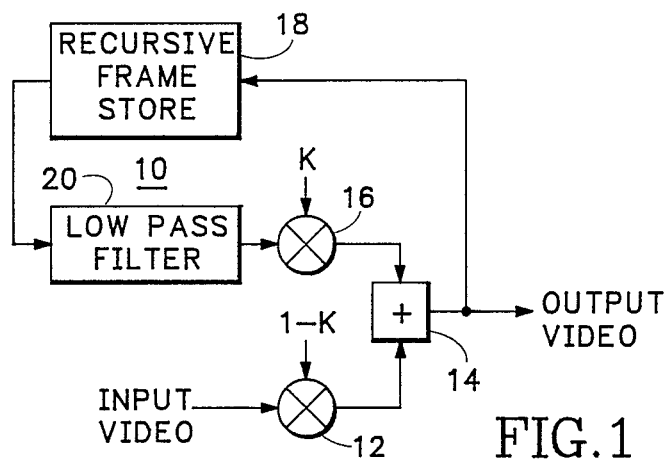
FIG. 1 is a block diagram view of an embodiment of a recursive video blur effect circuit according to the present invention.

Referring now to FIG. 1 a recursive video blur effects circuit 10 is shown. An input video signal is input to a first multiplier 12 where it is multiplied by the complement of a decay constant "k" having a value between zero and one. The output of the first multiplier 12 is input to an adder 14 together with the output from a second multiplier 16 to produce an output video signal. The output video signal is input to a recursive frame store 18 which outputs a video signal that is delayed one video frame from the input video signal. The delayed video signal is input to a lowpass filter 20 that blurs the delayed video signal before it is input to the second multiplier 16. The blurred delayed video signal is multiplied by the decay constant "k" before being input to the adder 14 for combination with the input video signal. The effect of this recursive blurring of the video signal due to the recursive lowpass filtering is that an image represented by the video signal is successively smeared, with the smearing of the image appearing to increase with time. Combining this smearing with the decay feature yields an image that is blurred as it fades out, giving the appearance that the image is vanishing like smoke. Moving objects, such as text used in title trails, that are put through the recursive video blur circuit 10 produce smoky trails similar to the fading contrails following jet airplanes.

Figure 2:
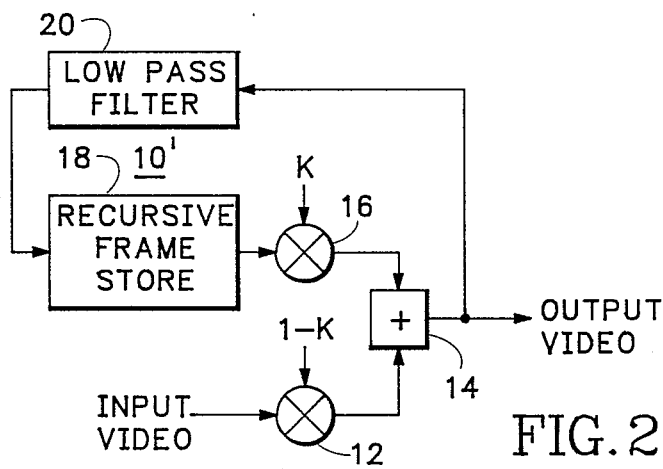
FIG. 2 is a block diagram view of a second embodiment of a recursive video blur effect circuit according to the present invention.

FIG. 2 presents an alternative embodiment of a recursive video blur effect circuit 10, that is the same as that of FIG. 1 except that the sequence of the recursive frame store 18 and the lowpass filter 20 is reversed in the recursive feedback loop. However the effect produced is the same. Also the decay multiplication circuitry, including multiplier 16, may be omitted and the decay incorporated into the lowpass filter 20 by making the spatial d.c. gain of the filter less than unity, i.e., equal to "k".

In practice the recursive loop is three parallel loops, one each for luminance, chrominance and key components of the input video signal. The luminance and chrominance components represent the input video signal as per industry standards, and the key component is used downstream of the recursive loop to combine the output video with other video signals. This key component is filtered in order to track the smearing of the luminance and chrominance images. Blurred images generally have edges with decreasing brightness, and similarly the key signal fades at the edges. This effect, when used with luminance keying in text displays, makes the edges of the text appear more transparent than the fresher parts of the text, contributing to the smoky quality of the effect.

Figure 3:
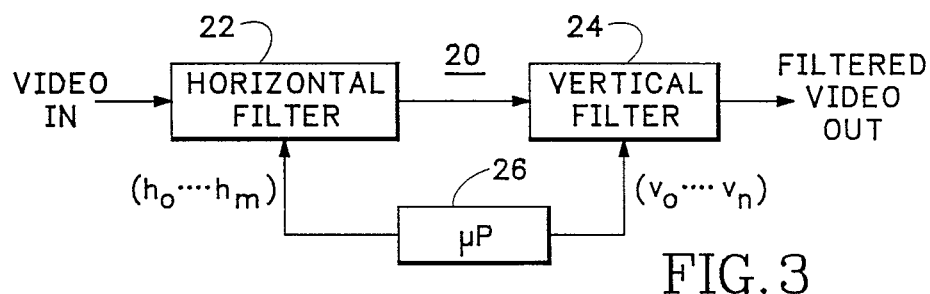
FIG. 3 is a block diagram view of a lowpass filter for use in a recursive video blur effect circuit according to the present invention.

The lowpass filter 20 may be implemented as a two-dimensional filter having a cascade of two one-dimensional filters 22, 24, one filtering in the horizontal direction and the other in the vertical direction as shown in FIG. 3. Such a combination yields a single two-dimensional filter whose impulse response is an array resulting from the outer product vector multiplication of the two filters' impulse responses as shown below:

$$\begin{vmatrix} h_o \\ h_1 \\ \cdot \\ \cdot \\ \cdot \\ h_m \end{vmatrix} * |v_o, v_1, \ldots v_n| = \begin{vmatrix} h_o v_o, h_1 v_o, \ldots h_m v_o \\ h_o v_1, h_1 v_1, \ldots h_m v_1 \\ \cdot \\ \cdot \\ \cdot \\ h_o v_n, h_1 v_n, \ldots h_m v_n \end{vmatrix}$$

where the horizontal filter 22 has m+1 coefficients and the vertical filter 24 has n+1 coefficients.

Figure 4:
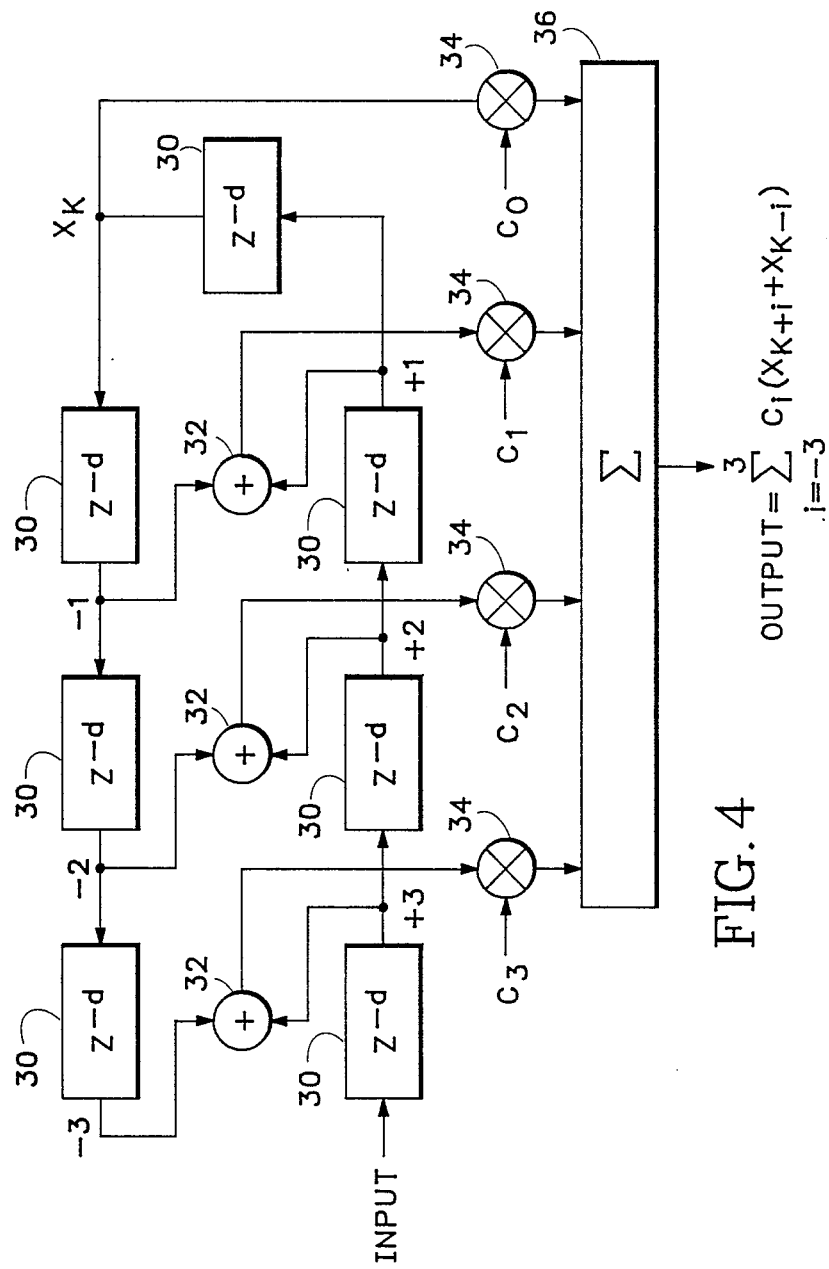
FIG. 4 is a generalized schematic diagram view of a linear-phase finite impulse response digital filter for the lowpass filter according to the present invention.

Both component filters may be implemented as discrete space finite impulse response (FIR) filters using digital computations on digitally encoded video signals. As shown in FIG. 4 an input digital signal is processed by a series of delay lines 30 having a delay function $Z^{-d}$. The taps between delay lines form symmetrical pairs about a central tap $X_k$. The symmetrical pairs are summed by adders 32, and the sums are input to respective multipliers 34 for multiplication by respective filter coefficients $c_o$-$c_m$ where m is a function of the number of delay elements 30. The coefficients correspond to the h and v coefficients described above according to whether the filter is a horizontal or vertical filter. The outputs of the multipliers 34 are summed by a summation circuit 36 to produce the filter output digital signal. The delay times for the filters are a function of the input signal (luminance/key or chrominance) and the filter type (horizontal or vertical). For a luminance horizontal filter the delay time for each delay element 30 is one pixel, while for a luminance vertical filter the delay time for each delay element is one video line. For a chrominance horizontal filter, due to the interlaced chrominance components, the delay time for each delay element 30 is two pixels, while for a chrominance vertical filter the delay time is one video line so that like components of the chrominance are filtered.

Both the horizontal and vertical filters 22, 24 have coefficients that specify the spatial frequency response of the filter and that are changeable and specified by a microprocessor to allow an operator to vary the amount of smearing, even on a field-by-field basis. The horizontal filter 22 operates by calculating a linear combination of neighboring horizontally oriented pixels for each filter output pixel, with these neighboring pixels being stored in shift registers that hold a small number of pixels. The vertical filter 24 operates by calculating a linear combination on neighboring vertically oriented pixels for each filter output pixel, with these neighboring pixels being stored in line delay circuits that hold entire video lines. A further variation is to change the filter coefficients on a pixel-by-pixel basis in a pseudo-random fashion. This changes the smear pattern for each pixel and makes the smoke/fade more natural looking by eliminating the uniformity of the smearing, i.e., some areas fade more quickly than others.

Figure 5:
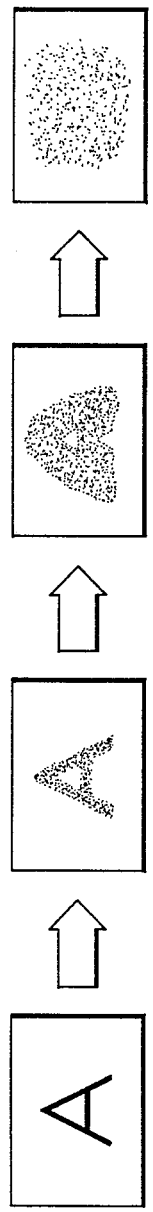
FIG. 5 is an illustration of the recursive video blur effect according to the present invention.
Figure 6:
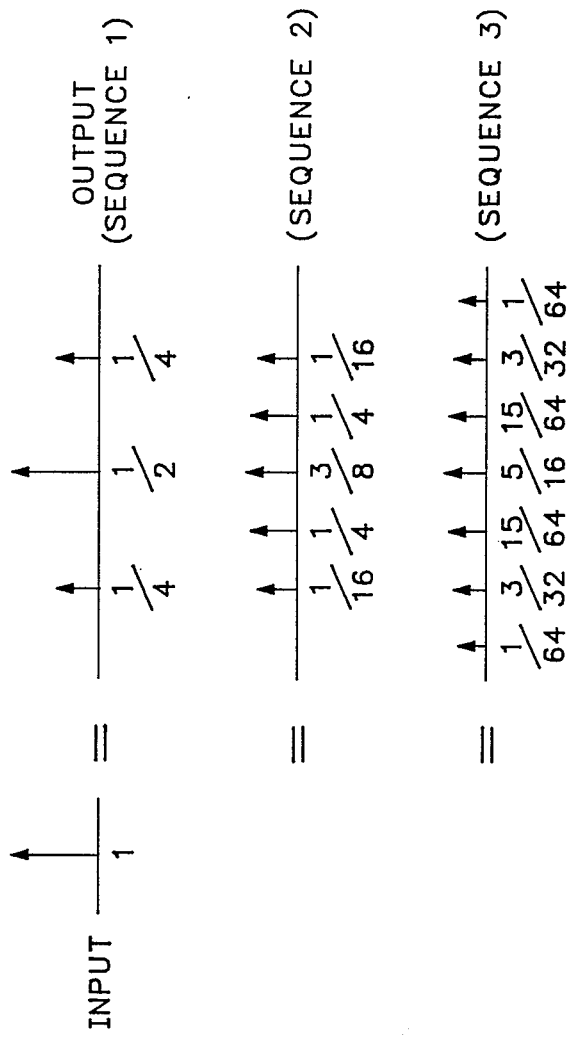
FIG. 6 is an illustration of the smearing of an impulse by the lowpass filter through successive recursive iterations according to the present invention.

FIG. 5 shows a single video frame that gets recursively lowpass filtered. The initial frame is a sharp letter "A", but after a few recursive iterations the "A" starts to dim and smear until finally the "A" becomes indecipherable and very dim before finally fading completely away. Where the filter coefficients add to one, such as a three-tap filter having coefficients of 174 , $\frac{1}{2}$, $\frac{1}{4}$, as the image blurs the total brightness of all the pixels adds to one, but since the image has been blurred over many pixels, the result is a dimmed image. This can be readily seen from FIG. 6 where a unity impulse is recursively filtered through three iterations of the lowpass filter having the coefficients of $\frac{1}{4}$, $\frac{1}{2}$, $\frac{1}{4}$. The first sequence reduces the unity impulse of one pixel to three pixels having a total brightness of unity, but with the maximum brightness of the center pixel being $\frac{1}{2}$. After the second sequence the single impulse is smeared over five pixels, with the brightest pixel being $\frac{3}{8}$. After the third sequence the single impulse is smeared over seven pixels, with the brightest pixel being 5/16. With a sufficient number of iterations the number of pixels could occupy The entire screen with no one pixel having sufficient brightness to register to the observer. Inserting the decay constant into the filter coefficients results in the sum of the coefficients being less than one.

Thus the present invention provides a recursive video blur effect by using a lowpass filter in a recursive feedback loop to blur successive passes of a video signal through the loop.

What is claimed is:

1. A circuit of the type having a recursive feedback loop including means for delaying an output video signal, means for decaying the delayed output video signal, and means for combining the decayed output video signal with an input video signal to produce the output video signal further comprising means for lowpass filtering the delayed output video signal before the combining means to produce a video blur effect in the output video signal.

2. An apparatus for producing a recursive video blur effect comprising:
    means for delaying an output video signal;
    means for lowpass filtering the delayed output video signal; and
    means for combining the filtered delayed output video signal with an input video signal to produce the output video signal.

3. An apparatus as recited in claim 2 further comprising means for decaying the filtered delayed output video signal prior to input to the combining means.

4. An apparatus as recited in claim 2 further comprising means for varying parameters of the lowpass filtering means so that the recursive video blur effect is nonuniform.

5. An apparatus for producing a recursive video blur effect comprising:
    means for lowpass filtering an output video signal;
    means for delaying the filtered output video signal; and
    means for combining the delayed filtered output video signal with an input video signal to produce the output video signal.

6. An apparatus as recited in claim 5 further comprising means for decaying the delayed filtered output video signal prior to input to the combining means.

7. An apparatus as recited in claim 5 further comprising means for varying parameters of the lowpass filtering means so that the recursive video blur is nonuniform.

* * * * *